United States Patent
Yoneyama et al.

(10) Patent No.: US 9,393,712 B2
(45) Date of Patent: Jul. 19, 2016

(54) STRUCTURE FOR PREVENTING FALLING OF FASTENING NUT OF PORTABLE POWER WORK MACHINE, AND FASTENING NUT ANCHOR MEMBER

(71) Applicant: YAMABIKO CORPORATION, Tokyo (JP)

(72) Inventors: Kazuhiro Yoneyama, Tokyo (JP); Motohide Terao, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 173 days.

(21) Appl. No.: 14/454,918

(22) Filed: Aug. 8, 2014

(65) Prior Publication Data

US 2015/0068048 A1    Mar. 12, 2015

(30) Foreign Application Priority Data

Sep. 11, 2013 (JP) ................................. 2013-188649

(51) Int. Cl.
*F16B 39/00* (2006.01)
*B27B 17/02* (2006.01)
(Continued)

(52) U.S. Cl.
CPC ............... *B27B 17/02* (2013.01); *B27B 17/00* (2013.01); *F16B 41/002* (2013.01); *F16B 2/248* (2013.01)

(58) Field of Classification Search
CPC .......... F16B 2/248; F16B 37/00; F16B 37/04; F16B 41/002; F16B 39/00; B27B 17/02
USPC ............ 411/81, 147, 190, 191, 194, 248, 250
See application file for complete search history.

(56) References Cited

U.S. PATENT DOCUMENTS

| 1,366,273 A | * | 1/1921 | Nettlefold | ............... F16B 39/20 411/250 |
| 2,108,654 A | * | 2/1938 | Dalley | .................. F16B 39/284 30/268 |

(Continued)

FOREIGN PATENT DOCUMENTS

| EP | 1 416 210 A1 | 5/2004 |
| GB | 527 340 A | 10/1940 |

(Continued)

OTHER PUBLICATIONS

Communication (extended European Search Report) dated Feb. 16, 2015 issued by the European Patent Office in related EPO Patent Application No. 14183462.2 (7 pages).

Primary Examiner — Roberta Delisle
(74) Attorney, Agent, or Firm — Lucas & Mercanti, LLP

(57) ABSTRACT

Provided is a structure for preventing the falling of a fastening nut of a portable power work machine, the structure reliably preventing loss of the nut and containing assembly cost, manufacturing cost, and component cost while reducing the possibility of damage, failure or the like and increasing the nut fastening and loosening workability and durability. A nut anchor member comprises a single bent wire or bar of elastically deformable material, and includes: a split ring-shaped portion externally retained in a circular groove provided at the outer periphery of a nut; a pair of left and right leg-like piece portions continuous with both ends of the split ring-shaped portion; and hook piece portions continuous with lower portions of the leg-like piece portions. A cover includes a locking portion that locks the hook piece portions so as to prevent the nut and the nut anchor member from falling from the cover when the nut is detached from the bolt.

8 Claims, 6 Drawing Sheets

(51) Int. Cl.
*F16B 41/00* (2006.01)
*B27B 17/00* (2006.01)
*F16B 2/24* (2006.01)

(56) References Cited

U.S. PATENT DOCUMENTS

| | | | | |
|---|---|---|---|---|
| 2,822,198 | A * | 2/1958 | Priestman | F16B 2/248 24/326 |
| 3,523,701 | A * | 8/1970 | Graham | F16B 2/248 285/130.1 |
| 3,525,373 | A * | 8/1970 | Kobayashi | B27B 17/00 173/162.1 |
| 3,602,284 | A * | 8/1971 | Smith | F16B 39/26 338/148 |
| 5,092,723 | A * | 3/1992 | Compton | B21J 15/12 411/120 |
| 5,174,702 | A | 12/1992 | Dolin | |
| 5,353,506 | A * | 10/1994 | Muller | B27B 17/02 30/383 |
| 8,132,484 | B2 * | 3/2012 | Pfleiderer | B27B 17/02 30/383 |
| 2010/0232904 | A1 | 9/2010 | Martinsson | |

FOREIGN PATENT DOCUMENTS

| | | |
|---|---|---|
| JP | S60-38701 U | 3/1985 |
| JP | 2011-500338 A | 1/2011 |
| WO | 2009/048356 A1 | 4/2009 |

* cited by examiner

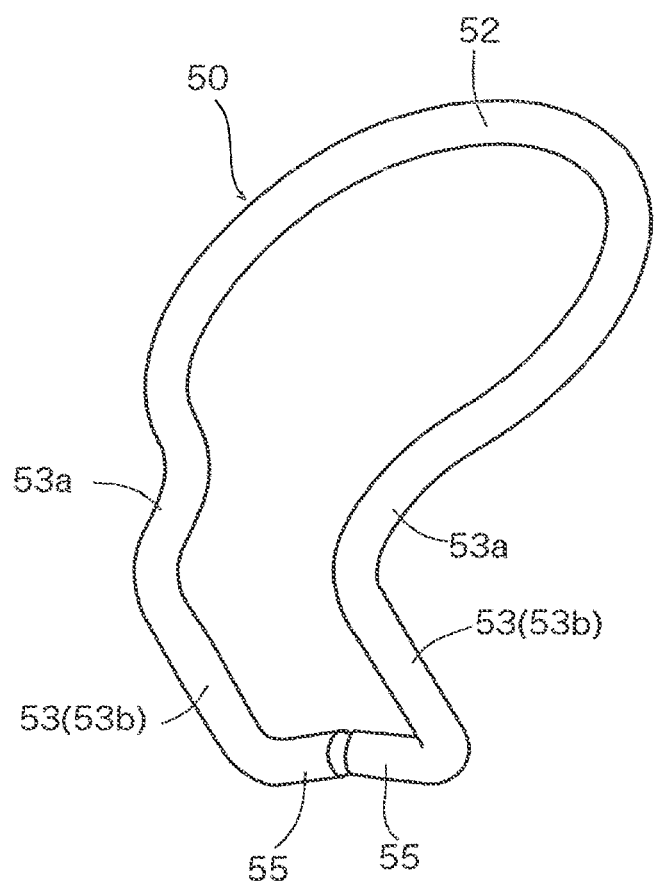

STRUCTURE FOR PREVENTING FALLING OF FASTENING NUT OF PORTABLE POWER WORK MACHINE, AND FASTENING NUT ANCHOR MEMBER

CROSS-REFERENCE TO RELATED APPLICATION

The present application claims the priority of Japanese patent application No. 2013-188649, filed on Sep. 11, 2013, the contents of which are incorporated herein by reference.

FIELD OF THE INVENTION

The present invention relates to structures for preventing the falling of a fastening nut of a portable power work machine. Particularly, the present invention relates to a structure for preventing the falling of a fastening nut of a portable power work machine in which the fastening nut is threadably engaged with a bolt embedded in a machine body portion so as to compressively hold a guide bar, with a saw chain extended around the bar, between the machine body portion and a cover, the machine body portion housing a power source such as an engine or an electric motor, a power transmission mechanism, and the like. The present invention also relates to a fastening nut anchor member.

BACKGROUND OF THE INVENTION

For example, a chain saw, which is a type of portable power work machine, normally includes a machine body portion housing a power source such as an engine or an electric motor, a power transmission mechanism, and the like; a cover attached to cover a predetermined region of the machine body portion (such as the power transmission mechanism portion including a drive sprocket); a guide bar held between the machine body portion and the cover and having a saw chain extended around the guide bar; bolts passed through an elongated hole or an elongated groove provided in the guide bar and through insertion holes provided in the cover, the bolts being securely embedded in the machine body portion; and fastening nuts threadably engaged with the bolts so as to compressively hold the guide bar between the machine body portion and the cover.

During the use of the chain saw, the saw chain may become elongated by heat, becoming loose. Thus, the saw chain needs to be re-tensioned from time to time. Also, when the saw chain or the guide bar is replaced, the tension of the saw chain needs to be adjusted after the saw chain is extended around the drive sprocket and the guide bar.

In order to adjust the tension of the saw chain, replace the guide bar, or maintain and check sliding portions, for example, it may become necessary to detach the cover from the machine body portion, requiring loosening the nuts and removing them from the bolts.

Once removed from the bolts, the nuts are separate from the machine body portion or the cover. Thus, the nuts may be easily lost, particularly during a logging operation in the mountains, for example. If the nuts are lost, the cover cannot be attached to the machine body portion, making it impossible to compressively hold the guide bar between the machine body portion and the cover.

Conventionally, structures for preventing the falling of the fastening nuts have been proposed, as described in Patent Documents 1 and 2, for example.

The structure for preventing the falling of the fastening nuts described in Patent Document 1 includes a nut anchor member for anchoring the nuts to the cover. The nut anchor member includes a circular portion externally held on a lower outer periphery of the nut by swaging; three downwardly extending leg-like piece portions extending downward from the circular portion; and bifurcated locking nail portions provided at the lower end of the leg-like piece portions. The cover is provided with associated locking holes for locking the bifurcated locking nail portions so as to prevent the nut and the nut anchor member from falling from the cover when the nut is detached from the bolt.

The structure for preventing the falling of the fastening nuts described in Patent Document 2 also includes a nut anchor member for anchoring the nut to the cover. The nut anchor member comprises an elastically deformable sheet or thin plate with its respective parts lying in a common plane, and includes a circular or split-circular externally fitting portion which is externally fitted into a circular groove portion provided at the lower outer periphery of the nut. The externally fitting portion is continuous with a U-shaped leg portion which is in turn continuous with a proximal end portion that is affixed to the cover with a screw.

SUMMARY OF THE INVENTION

In the structure for preventing the falling of the fastening nuts described in Patent Document 1, swaging is required to have the nut anchor member externally retained on the lower outer periphery of the nut. Further, because the bifurcated locking nail portions represent undercut portions during molding, the assembly cost, manufacturing cost, or component cost tends to increase. There is also the problem that the bifurcated locking nail portions (or the protruding nail portions thereof) tend to be readily damaged.

In addition, in the state where the nut is anchored with the bifurcated locking nail portions of the nut anchor member being passed through the locking holes provided in the cover, a gap is necessarily formed between the locking holes and the leg-like piece portions because of the structure. This tends to result in an inclination of the nut and the nut anchor member with respect to the center line of the bolt, making it difficult to perform a nut fastening and loosening operation quickly.

In the structure for preventing the falling of the fastening nuts described in Patent Document 2, the respective parts of the nut anchor member have low shape retaining property. As a result, the nut anchor member tends to be readily dragged, caught, caused to droop, or become inclined during the nut fastening and loosening operation, adversely affecting workability and durability.

The present invention was made in view of the above circumstances, and an object of the present invention is to provide a structure for preventing the falling of a fastening nut of a portable power work machine and a fastening nut anchor member that can reliably prevent the loss of the nut while containing assembly cost, manufacturing cost, and component cost, and that can increase the nut fastening and loosening workability and durability while minimizing the possibility of damage, failure and the like.

In order to achieve the object, the present invention provides a structure for preventing the falling of a fastening nut of a portable power work machine including a machine body portion, a cover attached to cover a predetermined region of the machine body portion, a guide bar held between the machine body portion and the cover, a bolt passed through an elongated hole or an elongated groove provided in the guide bar and through an insertion hole provided in the cover, the bolt being securely embedded in the machine body portion, and a fastening nut threadably engaged with the bolt so as to compressively hold the guide bar between the machine body portion and the cover. The structure includes an elastically deformable nut anchor member comprising a single wire, bar, or plate material. The nut anchor member includes: a split ring-shaped portion externally retained on an outer periphery of the nut and configured to prevent a fall from the nut while permitting rotation relative to the nut; a pair of left and right downwardly extending leg-like piece portions continuous with both ends of the split ring-shaped portion; and hook piece portions continuous with lower portions of the leg-like piece portions. The cover includes a locking portion configured to lock the hook piece portions so as to prevent the nut and the nut anchor member from falling from the cover when the nut is detached from the bolt.

Preferably, the nut anchor member may be L-shaped as viewed laterally.

Preferably, the locking portion of the cover may be configured to prevent rotation of the nut anchor member as well as lock the hook piece portions.

Preferably, the hook piece portion may be L-shaped or check-mark shaped.

Preferably, the locking portion of the cover may include an outer surface comprising a guide surface having a curved shape or a mountain shape with left and right inclined surfaces.

Preferably, the cover may include insertion guide holes to the left and right of the locking portion, the insertion guide holes allowing insertion of the pair of left and right leg-like piece portions with the hook piece portions even when the left and right leg-like piece portions are opened in inverted-V shape, and regulating movement of the leg-like piece portion in a forward-rearward direction.

Preferably, the pair of left and right leg-like piece portions may be configured to resiliently press onto left and right side surfaces of the locking portion of the cover.

Preferably, the locking portion of the cover may be configured to restrict inclination of a rotating axis of the nut with respect to a center line of the bolt in cooperation with the nut anchor member.

A fastening nut anchor member according to the present invention comprises a single bent wire, bar, or plate of an elastically deformable material, and includes: a split ring-shaped portion having C shape as viewed in plan; a pair of left and right downwardly extending leg-like piece portions having inverted-L shape as viewed laterally and including lateral side portions protruding outward from both ends of the split ring-shaped portion in the same plane as a plane of the split ring-shaped portion, and vertical side portions extending vertically downward from the lateral side portions; and hook piece portions continuous with lower portions of the leg-like piece portions and having L-shape or a check-mark shape.

In the structure for preventing the falling of a fastening nut according to the present invention, loss of the nut can be reliably prevented. In addition, because the nut anchor member comprises a single wire, bar, or plate of an elastically deformable material, and is assembled onto the nut and the cover using elastic deformation of the nut anchor member, assembly cost, manufacturing cost, and component cost can be contained while reducing the possibility of damage, failure, or the like. Further, because inclination of the nut and the nut anchor member with respect to the center line of the bolt can be restricted, the operation for fastening and loosening the nut can be easily and quickly performed. In addition, because the nut anchor member has an enhanced shape retaining property, the nut anchor member is not easily dragged, caught, caused to droop, or inclined, e.g., during the nut fastening and loosening operation. As a result, workability, durability, and the like can be increased.

BRIEF DESCRIPTION OF THE DRAWINGS

FIGS. 3A and 3B are perspective views of a nut anchor member, FIG. 3B showing the nut anchor member as assembled onto the nut.

DETAILED DESCRIPTION OF THE INVENTION

In the following, an embodiment of the present invention will be described with reference to the drawings.

Figure 1:
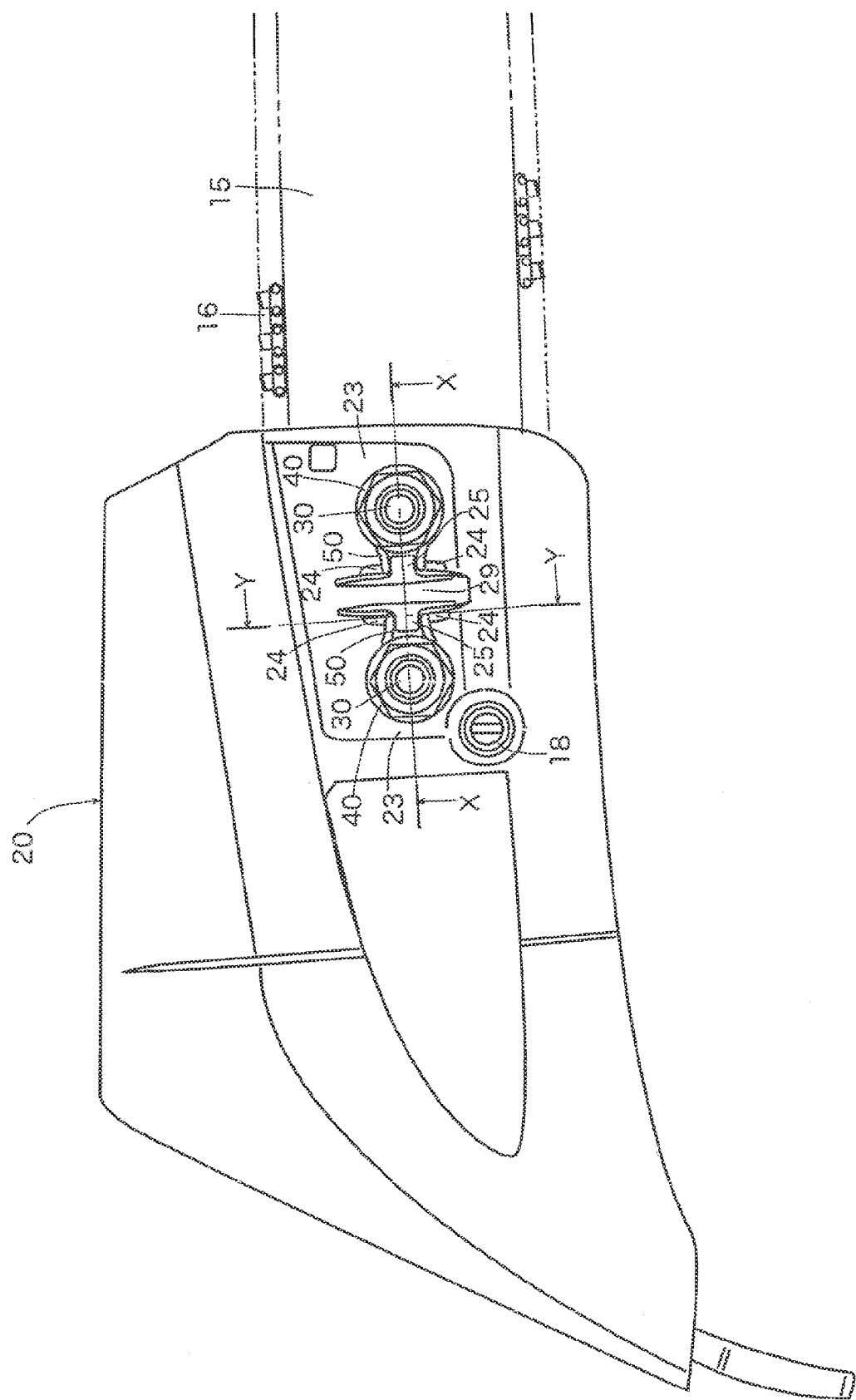
FIG. 1 is a partial side view of a main portion of a chain saw to which an embodiment of the structure for preventing the falling of a fastening nut of a portable power work machine according to the present invention is applied.
Figure 2A:
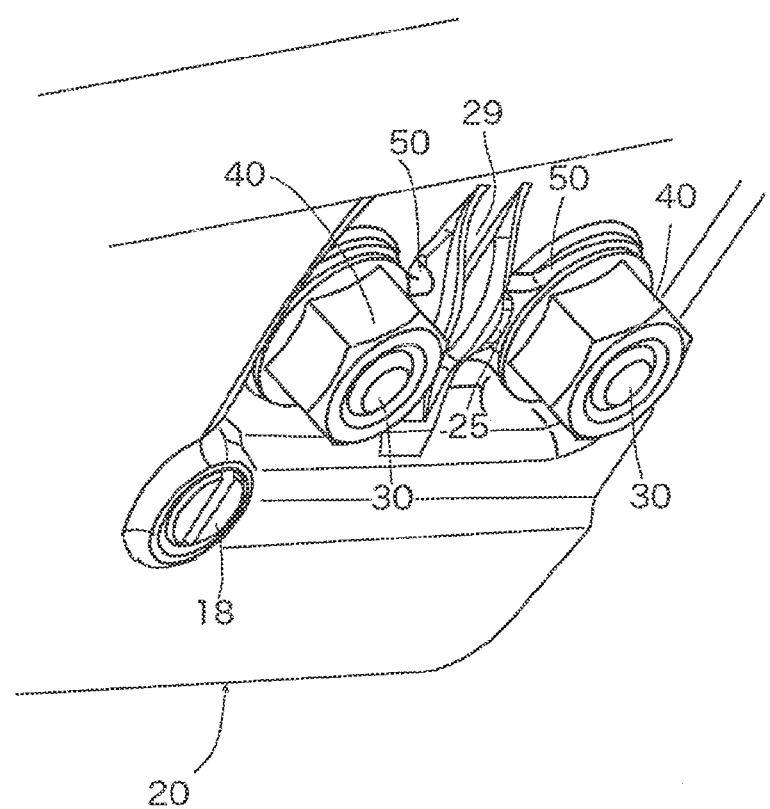
FIGS. 2A and 2B are perspective views of the main portion of the chain saw depicted in FIG. 1, FIG. 2A showing a right side portion and FIG. 2B partially showing a back side portion of a cover.
Figure 2B:
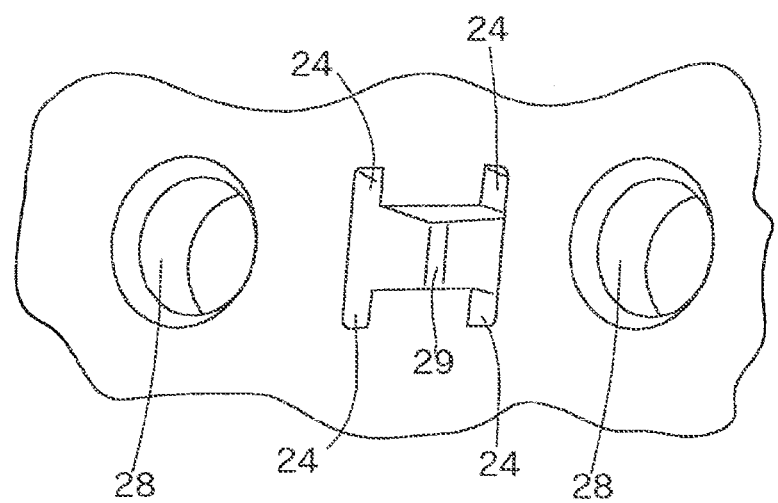

FIG. 1 is a partial side view of a main portion of a chain saw to which an embodiment of the structure for preventing the falling of a fastening nut of a portable power work machine according to the present invention is applied. FIG. 2A is a right side perspective view of the main portion of the chain saw illustrated in FIG. 1. FIG. 2B is a perspective view partially depicting a back side portion of a cover.

Figure 4A:
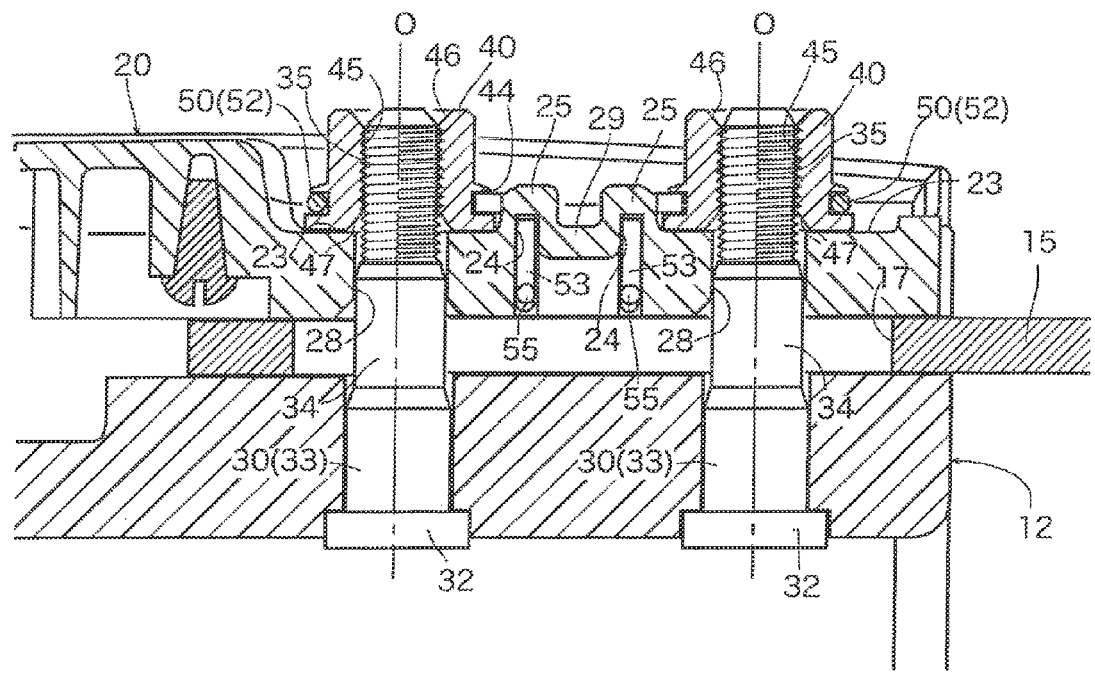
FIGS. 4A and 4B are cross sections taken along line X-X of FIG. 1, FIG. 4B showing a state in which the nut has been loosened from the state of FIG. 4A.

The chain saw depicted by way of example includes a machine body portion 12 (of which only a part of a right side portion is depicted in FIG. 4) having a power source such as an engine or an electric motor, a power transmission mechanism, and the like; a cover (sprocket guard and the like) 20 attached to cover a predetermined region (such as the power transmission mechanism portion including a drive sprocket) of the machine body portion 12; a guide bar 15 held between the machine body portion 12 and the cover 20 around which a saw chain 16 is extended; two bolts 30 passed through an elongated hole 17 (see FIG. 4A) provided in the guide bar 15 and through two bolt insertion holes 28 provided in the cover 20, the bolts being securely embedded, one fore and the other aft, in the right side portion of the machine body portion 12 at a predetermined interval; two fastening nuts 40 threadably engaged with the bolts 30 so as to compressively hold the guide bar 15 between the machine body portion 12 (the right side portion thereof) and the cover 20; and an adjusting screw 18 for adjusting the tension of the saw chain.

The bolts 30, as depicted in FIG. 4A, are securely embedded in the machine body portion 12 by force fitting or the like. The bolts 30 include, successively from the bottom, a rectangular flange portion 32, a large diameter portion 33, an intermediate diameter portion 34, and a male screw thread portion 35. Sections between the large diameter portion 33, the intermediate diameter portion 34, the male screw thread portion 35, and the front-end portion are formed by truncated cone-shaped portions.

Figure 3B:
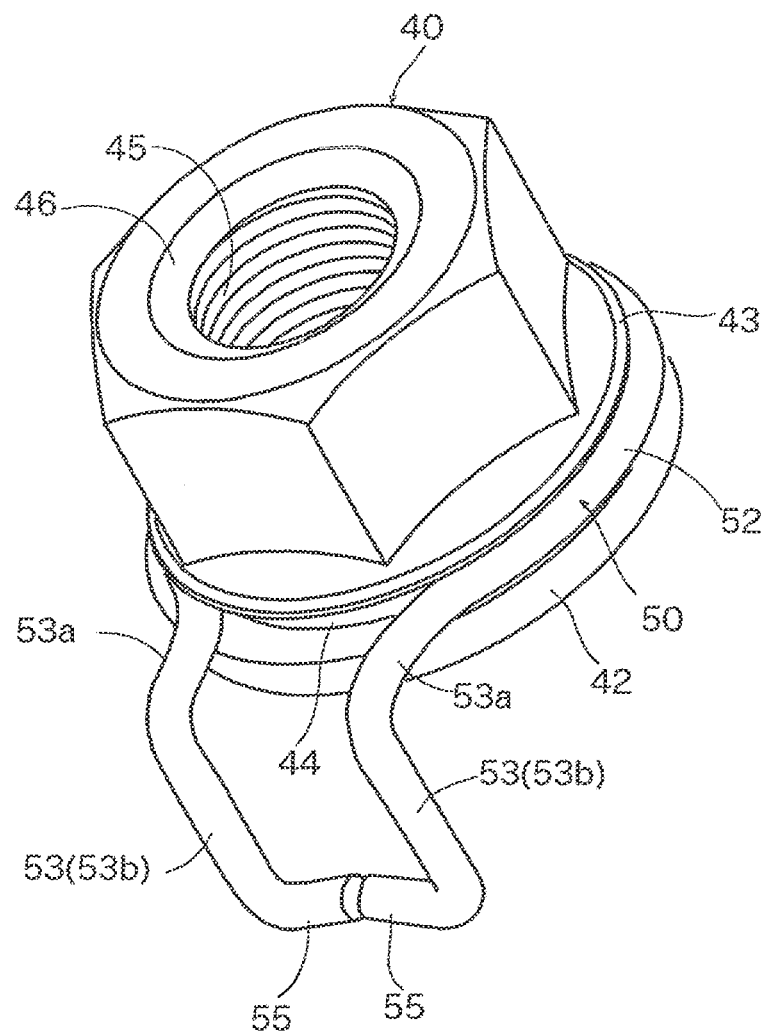

The fastening nuts 40, as depicted in FIG. 3B, are hexagonal nuts having a washer (large-diameter flange portion) 42 and a small-diameter flange portion 43, with a female screw thread portion 45 formed on the internal peripheral portion thereof for threaded engagement with the male screw thread portion 35 of the bolt 30. Between the washer (large-diameter flange portion) 42 and the small-diameter flange portion 43 on the outer peripheral portion, a circular groove 44 recessed radially inward is formed. Upper and lower end portions of the nuts 40 on the inner peripheral side thereof provide conical opening surfaces 46 and 47 (see FIG. 4A).

According to the present embodiment, the two bolts 30 are securely embedded in the right side portion of the machine body portion 12, one fore and the other aft, at a predetermined interval. Because the two bolts 30 are configured to be respectively threadably engaged with the fastening nuts 40, the structure for preventing the falling of a fastening nut according to the present invention is applied at two locations of the chain saw.

In the following, the structure for preventing the falling of the fastening nut will be described with reference to the nut 40 threadably engaged with the bolt 30 positioned on the left side in FIG. 1 (rearward of the machine body portion 12), while omitting redundant description of the other nut and bolt on the right side (forward of the machine body portion 12).

In addition to the above configuration, according to the present embodiment, a nut anchor member 50, which is L-shaped in side view, for anchoring the fastening nut 40 to the cover 20 is provided. The nut anchor member 50, as depicted in FIG. 3A, comprises a single bent metal wire or bar of an elastically deformable material, such as stainless steel material. The nut anchor member 50 includes a split ring-shaped portion 52 having C shape as viewed in plan; a pair of left and right downwardly extending leg-like piece portions 53 having inverted-L shape as viewed laterally and including lateral side portions 53a protruding outward from both ends of the split ring-shaped portion 52 in the same plane as that of the split ring-shaped portion 52, and further including vertical side portions 53b extending vertically downward from the lateral side portions 53a; and hook piece portions 55 continuous with the lower portions of the leg-like piece portions 53 and having a check-mark shape. The vertical side portions 53b of the pair of left and right leg-like piece portions 53 are parallel to each other. The hook piece portions 55 having the check-mark shape according to the present embodiment include locking ends bent upward by approximately 10 degrees, for example, compared with the L-shaped hook piece portions.

The split ring-shaped portion 52 of the nut anchor member 50 is externally retained (assembled) in the circular groove 44 provided at the outer periphery of the nut 40. The split ring-shaped portion 52 is retained in such a manner as to not fall from the nut 40 while permitting rotation relative to the nut 40. The nut anchor member 50 is assembled onto the nut 40 as follows, for example. The split ring-shaped portion 52 is elastically deformed (opened) by pulling and opening the pair of left and right leg-like piece portions 53, thus allowing the split ring-shaped portion 52 to ride over and across the hexagonal portion and the small-diameter flange portion 43 from above. Then, the opened state is released, thus allowing the split ring-shaped portion 52 to fall into the circular groove 44.

On the other hand, the cover 20 is provided with a locking portion 25 for locking the hook piece portions 55 for preventing the nut 40 and the nut anchor member 50 from falling from the cover 20 when the nut 40 is detached from the bolt 30. In FIG. 1, the locking portion 25 in the structure for preventing the falling of the fastening nut on the left side and the locking portion 25 in the structure for preventing the falling of the fastening nut on the right side are provided in a mirror symmetric manner, and are connected by a recessed portion 29.

Figure 5A:
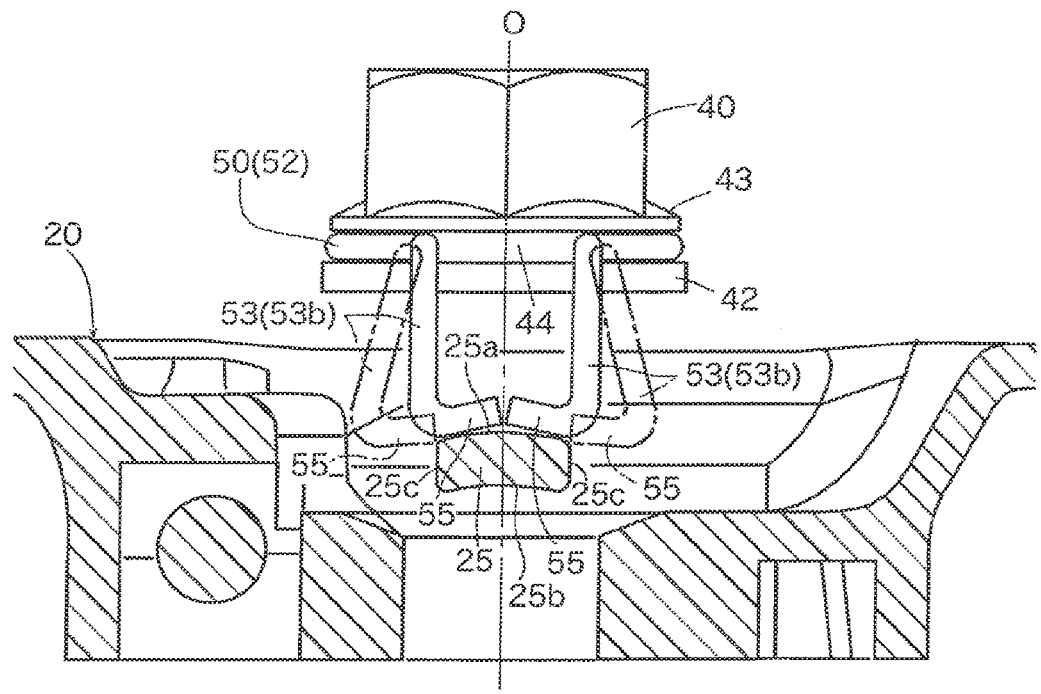
FIGS. 5A and 5B are cross sections taken along line Y-Y of FIG. 1 illustrating the assembly of the nut anchor member onto the cover, FIG. 5A showing a state in which the nut 40 and the nut anchor member are pressed onto a machine body portion side with hook piece portions of the nut anchor member being pressed onto an outer surface of a locking portion, and FIG. 5B showing a state in which a pair of left and right leg-like piece portions including the hook piece portions have returned from the state of FIG. 5A to their original parallel state due to their own elastic resilience.

As will be appreciated from FIG. 5A, the locking portion 25 includes an outer surface (upper surface) 25a and an inner surface (lower surface) 25b each with a gently curved cylindrical surface, and left and right rectangular side surfaces 25c parallel with a center line O of the bolt 30. The width of the locking portion 25 in the left-right direction (distance between the side surfaces 25c) is set to be slightly greater than the distance by which the vertical side portions 53b of the pair of left and right leg-like piece portions 53 are spaced apart from each other.

To the left and right of the locking portion 25 in the cover 20, insertion guide holes 24 are formed that allow the insertion of the pair of left and right leg-like piece portions 53 (the vertical side portions 53b thereof) even when they are opened in inverted-V shape (indicated by dashed and single-dotted lines in FIG. 5A) while regulating the movement of the leg-like piece portions 53 in a forward-rearward direction (see also FIGS. 1, 2A, and 2B).

When anchoring the nut 40 to the cover 20 with the nut anchor member 50 (assembly of the nut anchor member 50 to the cover 20), the hook piece portions 55 of the nut anchor member 50 are pressed onto the outer surface 25a of the locking portion 25, with the nut anchor member 50 (the split ring-shaped portion 52 thereof) mounted in the circular groove 44 of the nut 40, as indicated by solid lines in FIG. 5A. Then, in this state, the nut 40 and the nut anchor member 50 are pressed toward the machine body portion 12.

Figure 5B:
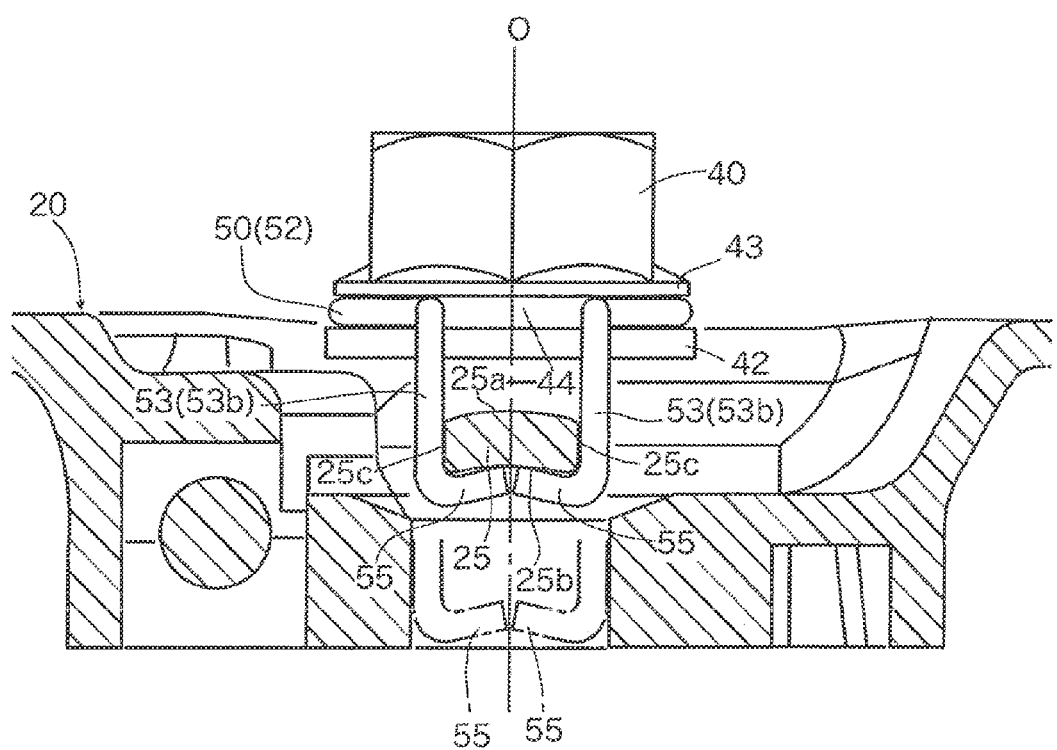

As the nut 40 and the nut anchor member 50 are pressed, the pair of left and right leg-like piece portions 53 with the hook piece portions 55 are guided along the outer surface (cylindrical guide surface) 25a of the locking portion 25 and opened in inverted-V shape, as indicated by the dashed and single-dotted lines in FIG. 5A. As the hook piece portions 55 slide over and move across the left and right side surfaces 25c of the locking portion 25, the pair of left and right leg-like piece portions 53 (the vertical side portions 53b thereof) with the hook piece portions 55 return to their original parallel state due to their elastic resilience, as indicated in FIG. 5B. Thus, the hook piece portions 55 (the locking ends thereof) come to be positioned on the lower side of the locking portion 25, with the vertical side portions 53b of the pair of left and right leg-like piece portions 53 resiliently pressed and closely attached onto the entire left and right side surfaces 25c of the locking portion 25 of the cover 20. In this way, the nut anchor member 50 is locked to the locking portion 25 so as not to fall from the cover 20, while the nut 40 is anchored to the cover 20 with the nut anchor member 50. In FIG. 5B, the position of the hook piece portions 55 when the nut anchor member 50 is depressed the most (fastened state of the nut 40) is indicated by the single-dotted lines.

In the following, the attaching of the cover 20 onto the machine body portion 12 and the operation for fastening and loosening the nut 40 will be described. When attaching the cover 20 to the machine body portion 12, the nut 40 is turned in a fastening direction (such as clockwise direction) while the lower end of the female screw thread portion 45 of the nut 40, which is being anchored to the cover 20 by the nut anchor member 50, is pressed onto the upper end of the male screw thread portion 35 of the bolt 30. This causes the female screw thread portion 45 of the nut 40 to threadably engage the male screw thread portion 35 of the bolt 30, so that the nut 40 can descend while being rotated by threaded feeding until eventually the lower end surface of the nut 40 abuts the pressing surface 23 of the cover 20. From this state, as the nut 40 is further turned for tighter fastening, the guide bar 15 is compressively held between the machine body portion 12 and the cover 20 (the state illustrated in FIG. 4A). During the operation for fastening the nut 40, the nut anchor member 50 together with the nut 40 descends with the leg-like piece portions 53 (the vertical side portions 53b thereof) sliding on the left and right side surfaces 25c of the locking portion 25 and the inner wall surface of the insertion guide hole 24.

Figure 4B:
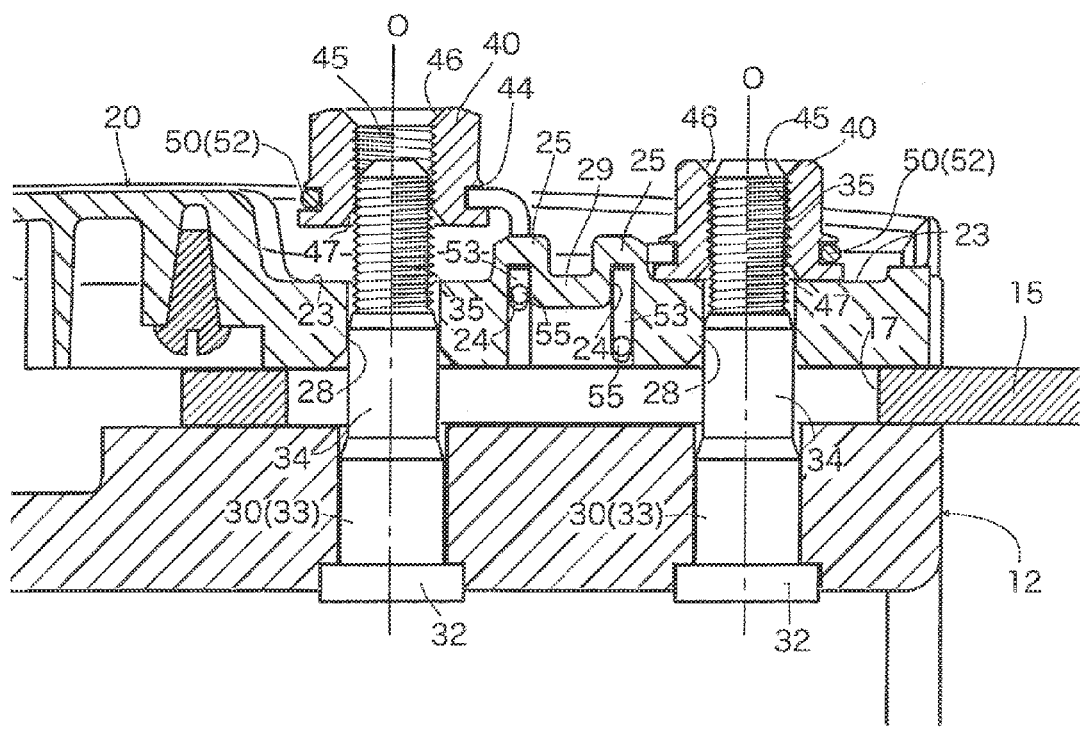

On the other hand, when detaching the cover 20 from the machine body portion 12, the nut 40 is turned in a loosening direction (such as anticlockwise direction) from the fastened state illustrated in FIG. 4A. As a result, the nut 40 ascends by being rotated by threaded feeding. A state in the loosening operation is illustrated in FIG. 4B. As the nut 40 is turned several rotations in the loosening direction from the state of FIG. 4B, the threaded engagement between the male screw thread portion 35 of the bolt 30 and the female screw thread portion 45 of the nut 40 is eventually eliminated, allowing the nut 40 to be removed from the bolt 30. By similarly eliminating the threaded engagement between the other bolt 30 and nut 40 (the right side ones), the cover 20 can be detached from the machine body portion 12.

In this case, in the structure for preventing the falling of the fastening nuts according to the present embodiment, the vertical side portions 53b of the pair of left and right leg-like piece portions 53 are resiliently pressed so as to become closely attached to the entire left and right side surfaces 25c of the locking portion 25 of the cover 20. Thus, movement of the nut anchor member 50 in the rotating direction and in the left-right direction (i.e., inclination with respect to the center line O of the bolt 30) is regulated. In this way, during the operation for fastening and loosening the nut 40, the nut anchor member 50 can be prevented from being dragged by the nut 40, while inclination of the rotating axis of the nut 40 with respect to the center line O of the bolt 30 in the left-right direction can be restricted. Namely, the locking portion 25 of the cover provides the function of not only preventing the falling of the nut anchor member 50 but also preventing the rotation of the nut anchor member 50, while restricting the inclination of the nut 40 in cooperation with the nut anchor member 50.

Further, because the movement of the leg-like piece portions 53 in the forward-rearward direction is also regulated by the insertion guide hole 24, inclination of the nut 40 and the nut anchor member 50 with respect to the center line O of the bolt 30 can be restricted. Thus, during the operation for fastening and loosening the nut 40, the nut 40 and the nut anchor member 50 do not wobble. In addition, because the nut anchor member 50 is L-shaped as viewed laterally, the rotating axis of the nut 40 can be easily aligned with the center line O of the bolt 30 when the female screw thread portion 45 of the nut 40 is threadably engaged with the male screw thread portion 35 of the bolt 30 so as to attach the cover 20 to the machine body portion 12. In this way, a so-called "inclined engagement" of the nut can be prevented, whereby not only the initial period of threaded engagement for attaching the cover 20 can be facilitated but also the operation for fastening and loosening the nut 40 can be easily and quickly performed.

In the structure for preventing the falling of the fastening nuts according to the above-described configuration, the nut 40 is anchored to the cover 20 by the nut anchor member 50. Thus, loss of the nut 40 is prevented even when the cover 20 is detached from the machine body portion 12.

As described above, in the structure for preventing the falling of the fastening nuts according to the present embodiment, the loss of the nut 40 can be reliably prevented by the simple configuration of the nut anchor member 50 comprising a single bent wire or bar of elastically deformable material. The nut anchor member 50 is assembled onto the nut 40 and to the cover 20 using elastic deformation of the nut anchor member 50. Thus, assembly cost, manufacturing cost, and component cost can be contained while decreasing the possibility of damage, failure, or the like. Further, inclination of the nut 40 and the nut anchor member 50 with respect to the center line O of the bolt 30 can be restricted, allowing the operation for fastening and loosening the nut 40 to be performed easily and quickly, and further increasing the shape retaining property of the nut anchor member 50. Accordingly, the nut anchor member 50 can be prevented from being dragged, caught, caused to droop, or becoming inclined, e.g., during the operation for fastening and loosening the nut. As a result, workability, durability, and the like can be increased.

While in the foregoing embodiment, the nut anchor member 50 comprises a single bent metal wire or bar of elastically deformable material, the present invention not limited to such embodiment. The nut anchor member 50 of a similar shape may be produced by metal molding using a synthetic resin material.

In the foregoing embodiment, the nut 40 is provided with the circular groove 44 configured to accommodate the split ring-shaped portion 52 of the nut anchor member 50. However, instead of the circular groove, the nut may be provided with pairs of upper and lower protruding pieces, such as six upper and six lower protruding pieces, protruding radially outward from the outer periphery of the nut, with the split ring-shaped portion mounted between the pairs of the upper and lower protruding pieces.

While the foregoing embodiment has been described with reference to a chain saw as an example of the portable power work machine, the present invention is not limited to such embodiment. The present invention may be applied to any portable power work machine as long as it is of the type in which a guide bar is compressively held between a machine body portion and a cover. Examples are a pole pruner with a chain saw unit attached to the end of a bush cutting operation pole, and an electric cutter.

DESCRIPTION OF SYMBOLS

12 Machine body portion
15 Guide bar
16 Saw chain
20 Cover
23 Pressing surface
24 Insertion guide hole
25 Locking portion
30 Bolt
35 Male screw thread portion
40 Nut
44 Circular groove
45 Female screw thread portion
50 Nut anchor member
52 Split ring-shaped portion
53 Downwardly extending leg-like piece portion
53a Lateral side portion
53b Vertical side portion
55 Hook piece portion

What is claimed is:

1. A structure for preventing the falling of a fastening nut of a portable power work machine including a machine body portion, a cover attached to cover a predetermined region of the machine body portion, a guide bar held between the machine body portion and the cover, a bolt passed through an elongated hole or an elongated groove provided in the guide bar and through an insertion hole provided in the cover, the bolt being securely embedded in the machine body portion, and a fastening nut threadably engaged with the bolt so as to compressively hold the guide bar between the machine body portion and the cover, wherein the structure includes an elastically deformable nut anchor member comprising a single wire, bar, or plate material, the nut anchor member comprising:

a split ring-shaped portion externally retained on an outer periphery of the nut and configured to prevent a fall from the nut while permitting rotation relative to the nut;

a pair of left and right downwardly extending leg piece portions continuous with both ends of the split ring-shaped portion; and hook piece portions continuous with lower portions of the leg piece portions, and wherein the cover includes a locking portion configured to lock the hook piece portions so as to prevent the nut and the nut anchor member from falling from the cover when the nut is detached from the bolt, and wherein the cover includes insertion guide holes to the left and right of the locking portion, the insertion guide holes allowing insertion of the pair of left and right leg piece portions with the hook piece portions even when the left and right leg piece portions are opened in inverted-V shape, and regulating movement of the leg piece portions in a forward-rearward direction.

2. The structure for preventing the falling of a fastening nut according to claim 1, wherein the nut anchor member is L-shaped as viewed laterally.

3. The structure for preventing the falling of a fastening nut according to claim 1, wherein the locking portion of the cover is configured to prevent rotation of the nut anchor member as well as lock the hook piece portions.

4. The structure for preventing the falling of a fastening nut according to claim 1, wherein the hook piece portion is L-shaped or check-mark shaped.

5. The structure for preventing the falling of a fastening nut according to claim 1, wherein the locking portion of the cover includes an outer surface comprising a guide surface having a curved shape or a mountain shape with left and right inclined surfaces.

6. The structure for preventing the falling of a fastening nut according to claim 1, wherein the pair of left and right leg piece portions are configured to resiliently press onto left and right side surfaces of the locking portion of the cover.

7. The structure for preventing the falling of a fastening nut according to claim 1, wherein the locking portion of the cover is configured to restrict inclination of a rotating axis of the nut with respect to a center line of the bolt in cooperation with the nut anchor member.

8. A fastening nut anchor member comprising a single bent wire, bar, or plate of an elastically deformable material, and including:

a split ring-shaped portion having C shape as viewed in plan;

a pair of left and right downwardly extending leg piece portions having inverted-L shape as viewed laterally and including lateral side portions protruding outward from both ends of the split ring-shaped portion in the same plane as a plane of the split ring-shaped portion, and vertical side portions extending vertically downward from the lateral side portions; and hook piece portions continuous with lower portions of the leg piece portions and having L-shape or a check-mark shape, wherein said hook piece portions face each other.

* * * * *